(12) United States Patent
Shao et al.

(10) Patent No.: US 12,033,616 B2
(45) Date of Patent: Jul. 9, 2024

(54) METHOD FOR TRAINING SPEECH RECOGNITION MODEL, DEVICE AND STORAGE MEDIUM

(71) Applicant: BEIJING BAIDU NETCOM SCIENCE TECHNOLOGY CO., LTD., Beijing (CN)

(72) Inventors: Junyao Shao, Beijing (CN); Xiaoyin Fu, Beijing (CN); Qiguang Zang, Beijing (CN); Zhijie Chen, Beijing (CN); Mingxin Liang, Beijing (CN); Huanxin Zheng, Beijing (CN); Sheng Qian, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 301 days.

(21) Appl. No.: 17/571,805

(22) Filed: Jan. 10, 2022

(65) Prior Publication Data
US 2022/0310064 A1 Sep. 29, 2022

(30) Foreign Application Priority Data
Mar. 23, 2021 (CN) .......................... 202110308608.0

(51) Int. Cl.
*G10L 15/06* (2013.01)
*G10L 15/16* (2006.01)
(Continued)

(52) U.S. Cl.
CPC ............ *G10L 15/063* (2013.01); *G10L 15/16* (2013.01); *G10L 15/183* (2013.01); *G10L 15/28* (2013.01)

(58) Field of Classification Search
CPC ..... G10L 15/063; G10L 15/16; G10L 15/183; G10L 15/28; G10L 15/10; G10L 15/22;
(Continued)

(56) References Cited

U.S. PATENT DOCUMENTS 6,208,964 B1 * 3/2001 Sabourin ............... G10L 15/063
704/235
10,896,669 B2 * 1/2021 Arik ..................... G10L 15/063
(Continued)

FOREIGN PATENT DOCUMENTS

| CN | 107578771 A | 1/2018 |
|---|---|---|
| CN | 109754809 A | 5/2019 |

(Continued)

OTHER PUBLICATIONS

Search Report of Chinese application No. 2021103086080 dated Aug. 27, 2021, 3 pages.
(Continued)

*Primary Examiner* — Thuykhanh Le
(74) *Attorney, Agent, or Firm* — Brooks Kushman P.C.

(57) ABSTRACT

A method for training a speech recognition model, a device and a storage medium, which relate to the field of computer technologies, and particularly to the fields of speech recognition technologies, deep learning technologies, or the like, are disclosed. The method for training a speech recognition model includes: obtaining a fusion probability of each of at least one candidate text corresponding to a speech based on an acoustic decoding model and a language model; selecting a preset number of one or more candidate texts based on the fusion probability of each of the at least one candidate text, and determining a predicted text based on the preset number of one or more candidate texts; and obtaining a loss function
(Continued)

based on the predicted text and a standard text corresponding to the speech, and training the speech recognition model based on the loss function.

15 Claims, 6 Drawing Sheets

(51) Int. Cl.
   *G10L 15/183* (2013.01)
   *G10L 15/28* (2013.01)
(58) Field of Classification Search
   CPC ......... G10L 15/18; G10L 15/02; G10L 15/26; G10L 2015/0631; G10L 15/14; G06N 20/00
   USPC .......................................................... 704/255
   See application file for complete search history.

(56) References Cited

U.S. PATENT DOCUMENTS

| | | | |
|---|---|---|---|
| 11,107,463 B2* | 8/2021 | Prabhavalkar | G10L 15/16 |
| 11,461,583 B2* | 10/2022 | Urtasun | G06N 3/08 |
| 11,587,569 B2* | 2/2023 | Ye | G10L 15/063 |
| 11,798,531 B2* | 10/2023 | Wang | G06N 3/044 |
| 2012/0143591 A1* | 6/2012 | Deng | G10L 15/183 704/2 |
| 2016/0336007 A1* | 11/2016 | Hanazawa | G06F 16/3343 |
| 2019/0348023 A1* | 11/2019 | Kwon | G10L 15/005 |
| 2020/0027444 A1* | 1/2020 | Prabhavalkar | G10L 15/02 |
| 2020/0043468 A1 | 2/2020 | Willett et al. | |
| 2020/0051549 A1* | 2/2020 | Chen | G10L 15/063 |
| 2020/0175961 A1 | 6/2020 | Thomson et al. | |
| 2020/0251124 A1* | 8/2020 | Yuan | G06N 3/047 |
| 2020/0258500 A1* | 8/2020 | Heigold | G06N 3/045 |
| 2020/0294488 A1* | 9/2020 | Li | G06F 40/242 |
| 2020/0327884 A1* | 10/2020 | Bui | G06N 3/08 |
| 2020/0335083 A1* | 10/2020 | Wan | G06N 3/044 |
| 2020/0335108 A1* | 10/2020 | Meng | G06N 3/045 |
| 2020/0357388 A1 | 11/2020 | Zhao et al. | |
| 2020/0402500 A1* | 12/2020 | Zhao | G10L 15/063 |
| 2021/0020175 A1* | 1/2021 | Shao | G10L 15/22 |
| 2021/0027766 A1* | 1/2021 | Shi | G10L 15/063 |
| 2021/0104223 A1* | 4/2021 | Beaufays | G10L 13/047 |
| 2021/0110259 A1* | 4/2021 | Lee | G06N 20/20 |
| 2021/0193119 A1* | 6/2021 | Lee | G10L 15/063 |
| 2021/0193161 A1* | 6/2021 | Delcroix | G10L 15/16 |
| 2021/0210109 A1* | 7/2021 | Weng | G10L 15/187 |
| 2021/0233512 A1* | 7/2021 | Peyser | G10L 15/063 |
| 2021/0280170 A1* | 9/2021 | Chen | G06N 3/088 |
| 2021/0327410 A1* | 10/2021 | Beaufays | G10L 15/22 |
| 2021/0327421 A1* | 10/2021 | Beaufays | G10L 15/10 |
| 2021/0335340 A1* | 10/2021 | Gowayyed | G10L 15/04 |
| 2021/0343273 A1* | 11/2021 | Tripathi | G10L 15/063 |
| 2021/0350786 A1* | 11/2021 | Chen | G10L 15/063 |
| 2021/0375270 A1* | 12/2021 | Weng | G10L 15/22 |
| 2021/0390944 A1* | 12/2021 | Richards | G06N 3/04 |
| 2022/0004868 A1* | 1/2022 | Moriya | G06N 3/044 |
| 2022/0044678 A1* | 2/2022 | Chen | G10L 25/30 |
| 2022/0068257 A1* | 3/2022 | Biadsy | G10L 13/033 |
| 2022/0093088 A1* | 3/2022 | Rangarajan Sridhar | G06F 16/338 |
| 2022/0122587 A1 | 4/2022 | Thomson et al. | |
| 2022/0147510 A1* | 5/2022 | Singh | G06F 16/2365 |
| 2022/0148571 A1* | 5/2022 | Wang | G10L 21/02 |
| 2022/0165253 A1* | 5/2022 | Sharifi | G10L 15/22 |
| 2022/0172707 A1* | 6/2022 | Wang | G10L 15/063 |
| 2022/0262344 A1* | 8/2022 | Yoon | G10L 15/22 |
| 2022/0383853 A1* | 12/2022 | Xu | G10L 15/32 |
| 2023/0072352 A1* | 3/2023 | Geng | G10L 15/16 |
| 2023/0377564 A1* | 11/2023 | Peyser | G06N 3/047 |
| 2023/0386473 A1* | 11/2023 | Li | G06N 3/045 |
| 2023/0419970 A1* | 12/2023 | Krishnaswamy | G10L 15/30 |

FOREIGN PATENT DOCUMENTS

| | | |
|---|---|---|
| CN | 110517693 A | 11/2019 |
| CN | 110534095 A | 12/2019 |
| CN | 111753549 A | 10/2020 |
| CN | 111128394 B | 12/2020 |
| CN | 112102815 A | 12/2020 |
| CN | 112509562 A | 3/2021 |
| JP | 2019133046 A | 8/2019 |
| JP | 2021501376 A | 1/2021 |
| JP | 2021039220 A | 3/2021 |
| KR | 20160082150 A | 7/2016 |

OTHER PUBLICATIONS

Search Report of Chinese application No. 2021103086080 dated Nov. 5, 2021, 2 pages.
Zhijun Fang et al., "Introduction to Data Science and Big Data Technology," Huazhong University of Science and Technology, Aug. 2019, 10 pages.
Extended European Search Report of European application No. 22150464.0 dated May 11, 2022, 8 pages.
Vaswani et al., "Attention Is All You Need", 31st Conference on Neural Information Processing Systems NIPS 2017, Dec. 9, 2017 (Dec. 9, 2017), XP055832424, Long Beach, CA, USA Retrieved from the Internet: URL:https://papers.nips.cc/paper/2017/file/3f5ee243547dee91 fbd053c1 c4a845aa-Paper.pdf, 11 pages.

* cited by examiner

METHOD FOR TRAINING SPEECH RECOGNITION MODEL, DEVICE AND STORAGE MEDIUM

CROSS-REFERENCE TO RELATED APPLICATIONS

The present disclosure claims the priority and benefit of Chinese Patent Application No. 202110308608.0, filed on Mar. 23, 2021, entitled "METHOD AND APPARATUS FOR TRAINING SPEECH RECOGNITION MODEL, DEVICE AND STORAGE MEDIUM." The disclosure of the above application is incorporated herein by reference in its entirety.

TECHNICAL FIELD

The present disclosure relates to the field of computer technologies, and particularly relates to the fields of speech recognition technologies, deep learning technologies, or the like, and more particularly to a method for training a speech recognition model, a device and a storage medium.

BACKGROUND

Automatic speech recognition (ASR) is a technology of converting a speech into a text. Different from a conventional ASR solution in which a speech recognition task is divided into a plurality of subtasks, input of an end-to-end speech recognition model is acoustic features, and output thereof is directly a natural language text, thereby simplifying a model training process.

The end-to-end speech recognition model may be configured as a sequence-to-sequence (Seq2Seq) model, the sequence-to-sequence model includes a decoder, and when the end-to-end speech recognition model is trained, the decoder may obtain a plurality of decoding results by means of beam search.

In a related art, when the decoder performs the beam search, the input only includes the output text at a previous moment and acoustic related information

SUMMARY

The present disclosure provides a method for training a speech recognition model, a device and a storage medium.

According to an embodiment of the present disclosure, there is provided a method for training a speech recognition model, including: obtaining a fusion probability of each of at least one candidate text corresponding to a speech based on an acoustic decoding model and a language model; selecting a preset number of the candidate texts based on the fusion probabilities of the candidate texts, and determining a predicted text based on the preset number of the candidate texts; and obtaining a loss function based on a standard text corresponding to the speech and the predicted text, and training the speech recognition model based on the loss function.

According to another embodiment of the present disclosure, there is provided an electronic device, including: at least one processor; and a memory connected with the at least one processor communicatively, wherein the memory stores instructions executable by the at least one processor to enable the at least one processor to carry out the method according to any one of the above-mentioned aspects.

According to another embodiment of the present disclosure, there is provided a non-transitory computer readable storage medium including computer instructions, which, when executed by a computer, cause the computer to carry out the method according to any one of the above-mentioned aspects.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

Figure 1:
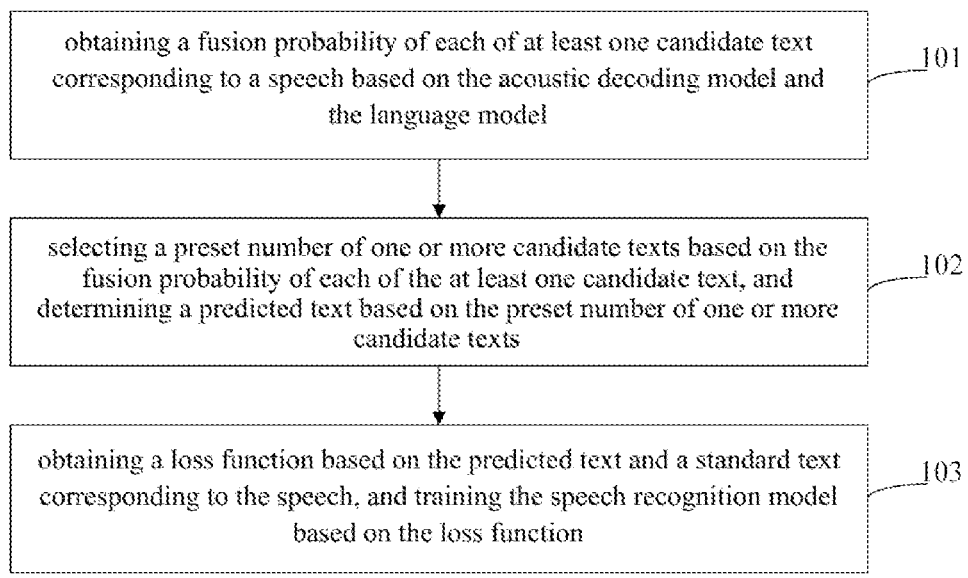
FIG. 1 is a schematic diagram according to a first embodiment of the present disclosure.

FIG. 1 is a schematic diagram according to a first embodiment of the present disclosure, this embodiment provides a method for training a speech recognition model, the speech recognition model includes an acoustic decoder and a language model, and the method includes:

101: obtaining a fusion probability of each of at least one candidate text corresponding to a speech based on an acoustic decoding model and the language model.

102: selecting a preset number of one or more candidate texts based on the fusion probability of each of the at least one candidate text and determining a predicted text based on the preset number of the one or more candidate texts.

103: obtaining a loss function based on the predicted text and a standard text corresponding to the speech, and training the speech recognition model based on the loss function.

In the embodiment of the present disclosure, the speech recognition model, for example, is an end-to-end speech recognition model. The end-to-end speech recognition model, for example, is an attention-based sequence-to-sequence model.

Figure 2:
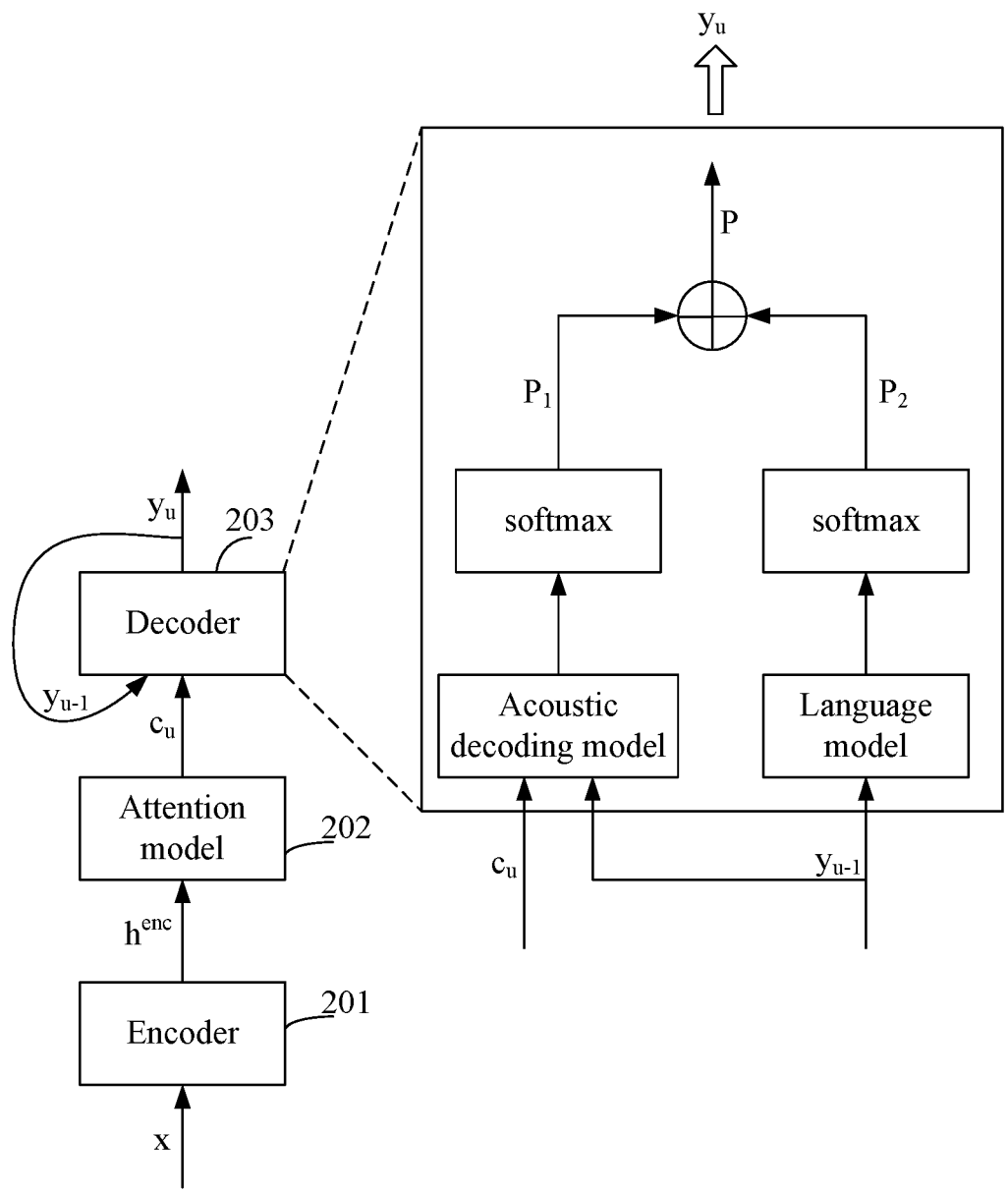
FIG. 2 is a schematic diagram according to a second embodiment of the present disclosure.

As shown in FIG. 2, the end-to-end speech recognition model may include an encoder 201, an attention model 202, and a decoder 203. Input of the encoder 201 is acoustic features which are represented by a vector x, and the acoustic features may be obtained by performing feature extraction on the speech using various related arts, for example, Filterbank features extracted frame by frame after frame division is performed on a speech signal. The encoder 201 encodes the acoustic features to obtain encoded features which are represented by a vector $h^{enc}$. The attention model 202 assigns different weights to different encoded features to obtain features after an attention processing operation, which are denoted by a vector $c_u$, u being an index of temporal information (step). The decoder 203 outputs a text, and the text may be output character by character; that is, the decoder 203 obtains an output text sequence based on input features, the input features include an output text $y_{u-1}$ at a previous moment and $c_u$ output by the attention model 202, and output of the decoder 203 is the output text $y_u$ at the current moment. Further, $y_u$ may include a beginning character [SOS] and an ending character [EOS]. For example, if the speech is "今天天气 (pronounced as "jin tian tian qi")," "今 (jin)" may be predicted from the beginning character [SOS], "天 (tian)" is predicted from "今 (jin)," and so on, until the ending character [EOS] is output.

Output of the attention model may be understood to resemble output of an acoustic model in a conventional ASR solution, and thus, the output $c_u$ of the attention model may be understood as the acoustic related information; in the related art, the input of the decoder includes only the output text $y_{u-1}$ at the previous moment and the acoustic related information $c_u$, and correspondingly, the decoder in the related art may be understood to include only the acoustic decoding model.

In the embodiment of the present disclosure, referring to FIG. 2, the decoding operation relies on both the acoustic related information and language related information. As shown in FIG. 2, the decoder includes both the acoustic decoding model and the language model (LM) configured to predict the output text at the current moment based on the output text at the previous moment. A number of output nodes of the acoustic decoding model is the same as a total number of the candidate texts, a number of output nodes of the language model is also the same as the total number of the candidate texts, the number of the candidate texts may be one or plurality, and the plurality refers to at least two. For example, if M candidate texts are provided, the number of the output nodes of the acoustic decoding model and the number of the output nodes of the language model are both M, the output of the acoustic decoding model and the output of the language model may be processed using softmax respectively to obtain a numerical value between [0, 1], and when one candidate text is provided, the numerical value is the probability that the candidate text is the standard text; generally, a plural candidate texts are provided, and in this case, the probability corresponding to each of the plural candidate texts is required to be determined, and taking the determination of the probability corresponding to each candidate text as an example for description, the numerical value is the probability that each candidate text is the standard text, and the standard text refers to a correct text corresponding to the speech. For differentiation, the output of the acoustic decoding model after the softmax processing operation may be referred to as a first probability $P_1$, the output of the language model after the softmax processing operation may be referred to as a second probability $P_2$, and then, the fusion probability P of each candidate text may be calculated based on the first probability $P_1$ and the second probability $P_2$; for example, the first probability $P_1$ and the second probability $P_2$ are subjected to weighted summation, and the weighted summation value is taken as the fusion probability P. A weighting coefficient in the weighted summation may be set according to actual requirements. The fusion probability is calculated for each candidate text; for example, for the candidate text "今 (jin)," the first probability of "今 (jin)" may be determined using the acoustic decoding model, the second probability of "今 (jin)" may be determined using the language model, and then, the fusion probability of "今 (jin)" may be calculated based on the first probability of "今 (jin)" and the second probability of "今 (jin)".

After the fusion probability of each candidate text is obtained, assuming that a beam search width is N, N candidate texts may be selected according to the descending fusion probabilities. For example, for "今天天气 (jintian tianqi)", when the output character at a first moment is predicted, the candidate texts may include "今 (jin)," "金 (jin)" and "斤 (jin)," assuming that the fusion probability of "今 (jin)" is 0.7, the fusion probability of "金 (jin)" is 0.2, and the fusion probability of "斤 (jin)" is 0.1, if N=2, "今 (jin)" and "金 (jin)" may be selected.

After selection of the N candidate texts, the predicted text may be determined based on the N candidate texts. For example, the N candidate texts may be directly used as the predicted texts. For example, for the first moment, "今 (jin)" and "金 (jin)" are used as the predicted texts.

After the predicted text is obtained, the loss function may be calculated based on the predicted text and the standard text. The standard text refers to the correct text of the speech, and may be obtained by means of manual annotation; for example, in the above example, the standard text is "今天天气 (jin tian tian qi)." The loss function may be a loss function adopted in a discrimination training algorithm, and a specific form may be selected according to actual requirements, for example, a cross entropy function, or the like. In the embodiment of the present disclosure, the loss function is a word error rate function. The word error rate function is formulated as:

$$L_{werr}^{N-best}(x, y^*) = \sum_{y_i \in Beam(x,N)} \hat{P}(y_i | x)\left[W(y_i, y^*) - \hat{W}\right]$$

$$\hat{P}(y_i | x) = \frac{P(y_i | x)}{\sum_{y_i \in Beam(x,N)} P(y_i | x)}$$

wherein $L_{werr}^{N-best}(x, y^*)$ is the loss function; $y_i$ is the ith predicted text, and N predicted texts are provided in total; $y^*$ is the standard text; $W(y_i, y^*)$ is a number of errors of the ith predicted text, i.e., a number of errors of $y_i$ with respect to $y^*$; $\hat{W}$ is an average number of errors of the N predicted texts; $\hat{P}(y_i|x)$ is a normalized value, and $P(y_i|x)$ is a distribution probability of the output character $y_i$, such as the fusion probability P of $y_i$.

After the loss function is obtained, the speech recognition model may be trained based on the loss function; that is, the speech recognition model is initialized randomly or by loading a pre-trained model; after the initialization, parameters of the speech recognition model are adjusted until the loss function converges, and the speech recognition model when the loss function converges is used as the finally obtained speech recognition model. The speech recognition model includes the encoder, the attention model and the decoder, the decoder includes the acoustic decoding model and the language model, the encoder, the acoustic decoding model and the language model may all be configured as deep neural network models, and specific model structures may be selected according to actual requirements; for example, the encoder, the acoustic decoding model and the language model may all be configured as recurrent neural network (RNN) models, and a multi-headed attention model is used as the attention model.

In this embodiment, the fusion probability of the candidate text is calculated based on the acoustic decoding model and the language model, and the candidate text is selected based on the fusion probability, such that reference may be made to both the acoustic related information and related information of the language model when the candidate text is selected, thereby improving recognition accuracy of the speech recognition model.

Figure 3:
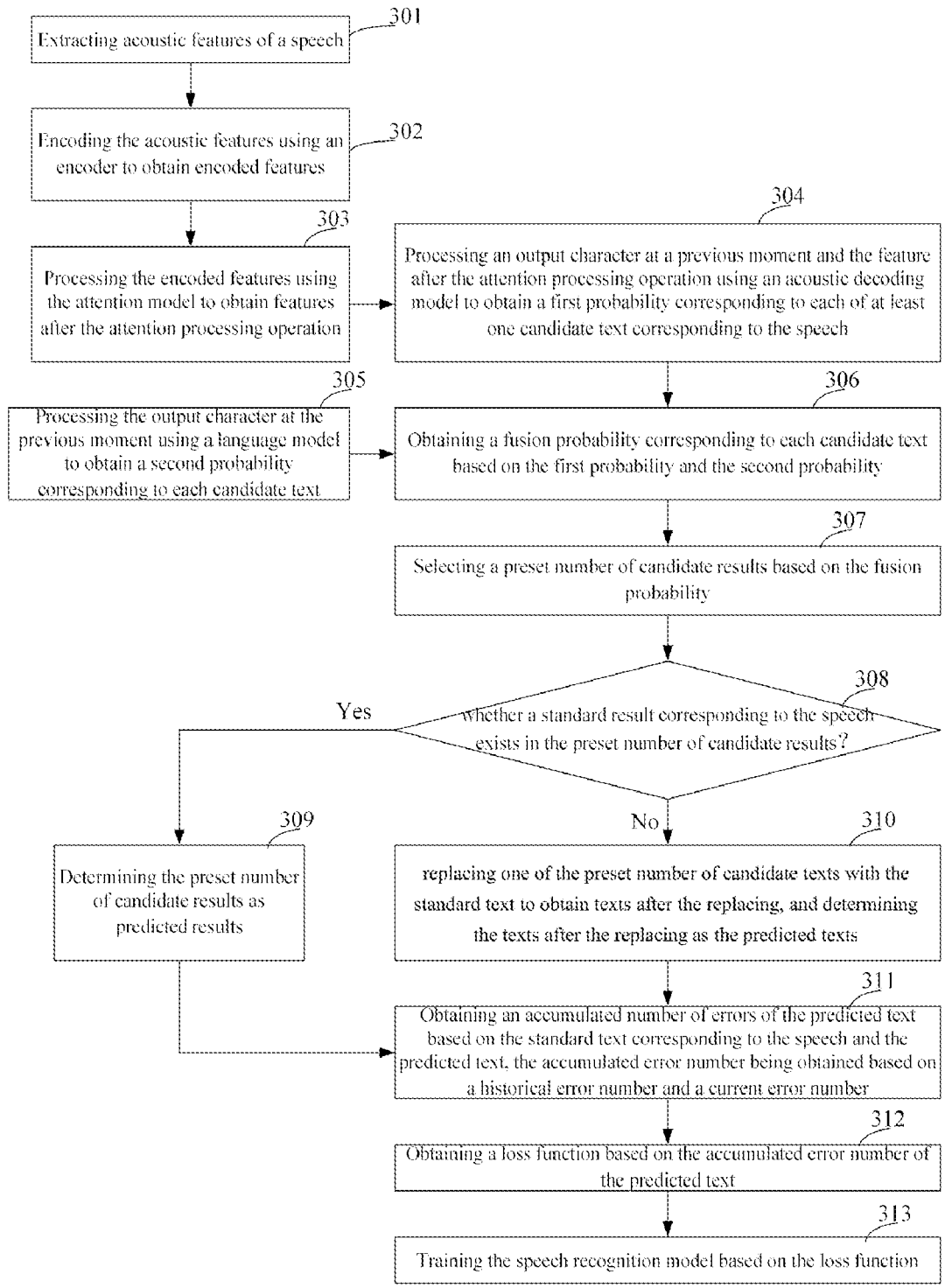
FIG. 3 is a schematic diagram according to a third embodiment of the present disclosure.

FIG. 3 is a schematic diagram according to a third embodiment of the present disclosure, this embodiment provides a method for training a speech recognition model, and takes character-by-character output as an example, and in conjunction with the structure shown in FIG. 2, the method includes:

301: extracting acoustic features of a speech.

The speech is, for example, a speech corresponding to "今天天气 (jin tian tian qi)."

The acoustic features, such as FilterBank features, may be extracted using various related arts.

302: encoding the acoustic features using an encoder to obtain encoded features.

The encoder may be configured as an RNN model, such as a long short-term memory (LSTM) model.

303: performing an attention processing operation on the encoded features using the attention model to obtain features after the attention processing operation.

The attention model may adopt a model in various related arts, such as a multi-headed attention model.

In this embodiment, the acoustic features are extracted and encoded, and the attention processing operation is performed on the encoded features, such that semantic features may be obtained and decoded to obtain a predicted text, thereby training the speech recognition model based on the predicted text.

304: processing an output character at a previous moment and the feature after the attention processing operation using an acoustic decoding model to obtain a first probability corresponding to each of at least one candidate text corresponding to the speech.

The acoustic decoding model may be configured as an RNN model, such as a long short-term memory (LSTM) model.

For example, if the speech is a speech corresponding to "今天天气 (jin tian tian qi)" and "今 (jin)" is to be predicted at a current moment, a processing operation may be performed by the acoustic decoding model based on a beginning character [SOS] and the feature $c_1$ after the attention processing operation at the current moment, so as to obtain the first probability corresponding to each candidate text; for example, if the candidate texts include "今 (jin)," "金 (jin)", or the like, the first probabilities of "今 (jin)," "金 (jin)," or the like, may be predicted.

305: processing the output character at the previous moment using a language model to obtain a second probability corresponding to each candidate text.

The language model may be configured as a neural network model, such as an RNN model, a Transformer model, or the like.

For example, if "今 (jin)" is to be predicted at the current moment, a processing operation may be performed by the language model based on the beginning character [SOS], so as to obtain the second probability corresponding to each candidate text; for example, if the candidate texts include "今 (jin)," "金 (jin)," or the like, the second probabilities of "今 (jin)," "金 (jin)," or the like, may be predicted.

306: obtaining a fusion probability corresponding to each candidate text based on the first probability and the second probability.

Specifically, for each candidate text, the first probability and the second probability may be subjected to weighted summation to obtain a weighted summation value, and the weighted summation value may be determined as the fusion probability of the corresponding candidate text.

For example, the first probability and the second probability of "今 (jin)" are subjected to weighted summation to obtain the fusion probability of "今 (jin)."

In this embodiment, the fusion probability is obtained by performing weighted summation on the first probability and the second probability, thus simply and conveniently calculating the fusion probability.

307: selecting a preset number of candidate texts based on the fusion probability.

Specifically, the candidate texts with a number equal to a beam search width may be selected according to the fusion probabilities in descending order; for example, the beam search width is represented by N, and if N=2, for a first moment, assuming that "今 (jin)" and "金 (jin)" have higher fusion probabilities, "今 (jin)" and "金 (jin)" are selected as the candidate texts at the first moment.

308: judging whether a standard text corresponding to the speech exists in the preset number of candidate texts, if yes, executing 309, and otherwise, executing 310.

The standard text corresponding to the speech may be obtained by means of manual annotation; for example, the standard text is "今 (jin)" for the first moment.

309: determining the preset number of candidate texts as the predicted texts.

310: replacing one of the preset number of candidate texts with the standard text to obtain texts after the replacing, and determining the texts after the replacing as the predicted texts.

For example, for the first moment, if the standard text is "今 (jin)", and the selected N candidate texts are "金 (jin)" and "斤 (jin)," but do not include "今 (jin)," the standard text "今 (jin)" may be forcibly included in the predicted text. Specifically, the previous candidate text may be replaced with the standard text by means of a code in a specified output path or a randomly selected output path; for example, "斤 (jin)" is replaced with "今 (jin)," and then, the predicted texts are "今 (jin)" and "金 (jin)."

In the related art, in a discrimination training process, generally, a candidate text with an error rate higher than an average error rate is suppressed, and a candidate text with an error rate lower than the average error rate is encouraged. However, if the N candidate texts do not have a completely correct result, there exists a problem of encouraging an erroneous result.

In this embodiment, by replacing the candidate text with the standard text, the standard text may be forcibly included in the predicted text, thus improving a recognition effect of the speech recognition model.

311: obtaining an accumulated number of errors of the predicted text based on the standard text corresponding to the speech and the predicted text, the accumulated error number being obtained based on a historical error number and a current error number.

The current error number is a number of errors of the predicted text at the current moment with respect to the standard text, and the historical error number is a number of errors of the predicted text at a historical moment before the current moment with respect to the standard text.

Figure 4:
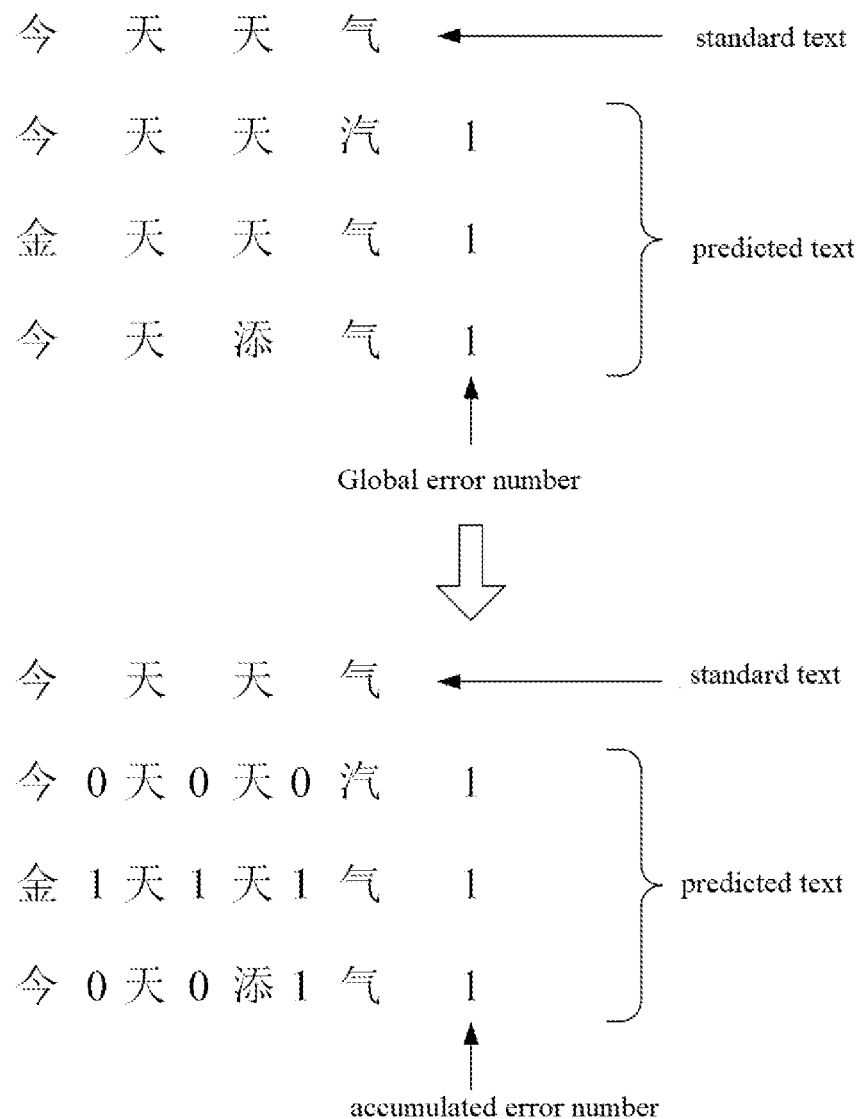
FIG. 4 is a schematic diagram according to a fourth embodiment of the present disclosure.

For example, referring to FIG. 4, the standard text is "今天天气 (jin tian tian qi)", and in the related art, as shown on the upper side of FIG. 4, the error number is calculated according to the whole sentence, and since the whole sentence error numbers (global error numbers) of the three predicted texts are all 1, a local error optimizing effect is unable to be achieved.

In this embodiment, as shown on the lower side of FIG. 4, the error number is calculated on a per moment basis; for example, the error numbers of "今 (jin)" and "仓 (jin)" are calculated for a first moment; the accumulated numbers of errors of "今 (jin)" and "天 (tian)" as well as the accumulated numbers of errors of "金 (jin)" and "天 (tian)" are calculated for a second moment; the accumulated numbers of errors of "今 (jin)," "天 (tian)" and "大 (tian)," the accumulated numbers of errors of "金 (jin)," "天 (tian)" and "天 (tian)," as well as the accumulated numbers of errors of "今 (jin)," "大 (tian)" and "添 (tian)" are calculated for a third moment, and so on, until the whole sentence is finished.

In this embodiment, the local error optimizing effect may be achieved by calculating the accumulated error number.

312: obtaining a loss function based on the accumulated error number of the predicted text.

313: training the speech recognition model based on the loss function.

In this embodiment, the first probability is calculated using the acoustic decoding model, the second probability is calculated using the language model, the fusion probability is obtained based on the first probability and the second probability, and the candidate text is selected based on the fusion probability, such that the more accurate candidate text may be obtained, thereby improving the recognition effect of the speech recognition model.

Figure 5:
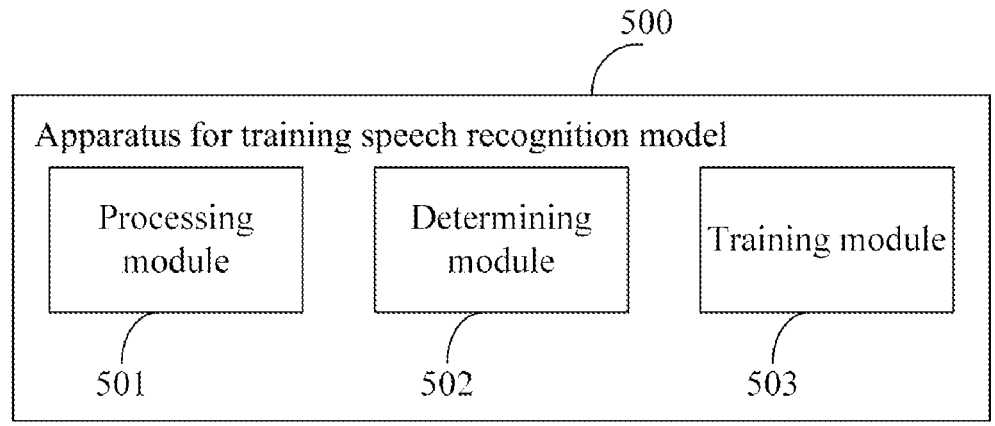
FIG. 5 is a schematic diagram according to a fifth embodiment of the present disclosure.

FIG. 5 is a schematic diagram according to a fifth embodiment of the present disclosure, this embodiment provides an apparatus for training a speech recognition model, and the apparatus 500 includes a processing module 501, a determining module 502 and a training module 503. The processing module 501 is configured for obtaining a fusion probability of each of at least one candidate text corresponding to a speech based on an acoustic decoding model and a language model; the determining module 502 is configured for selecting a preset number of one or more candidate texts based on the fusion probability of each of the at least one candidate text, and determine a predicted text based on the preset number of candidate texts; the training module 503 is configured to obtain a loss function based on the predicted text and a standard text corresponding to the speech, and train the speech recognition model based on the loss function.

In some embodiments, the processing module 501 is specifically configured for: processing an output text at a previous moment and acoustic related information at a current moment using the acoustic decoding model to obtain a first probability corresponding to the at least one candidate text corresponding to the speech; processing the output text at the previous moment using the language model to obtain a second probability corresponding to the candidate text; and obtaining the fusion probability of the candidate text based on the first probability and the second probability.

In some embodiments, the processing module 501 is specifically configured for: for the candidate text, performing weighted summation of the first probability and the second probability to obtain a weighted summation value, and determining the weighted summation value as the fusion probability of the corresponding candidate text.

In some embodiments, the determining module 502 is specifically configured for: if the preset number of the one or more candidate texts include the standard text, determining the preset number of the one or more candidate texts as the predicted texts; or if the preset number of the one or more candidate texts do not include the standard text, replace one candidate text of the preset number of the one or more candidate texts with the standard text to obtain one or more texts after the replacing, and determining the one or more texts after the replacing as the predicted text.

In some embodiments, the training module 503 is specifically configured for: obtaining an accumulated number of errors of the predicted text based on the predicted text and the standard text corresponding to the speech, the accumulated error number being obtained based on a historical error number and a current error number; and obtaining the loss function based on the accumulated error number of the predicted text.

Figure 6:
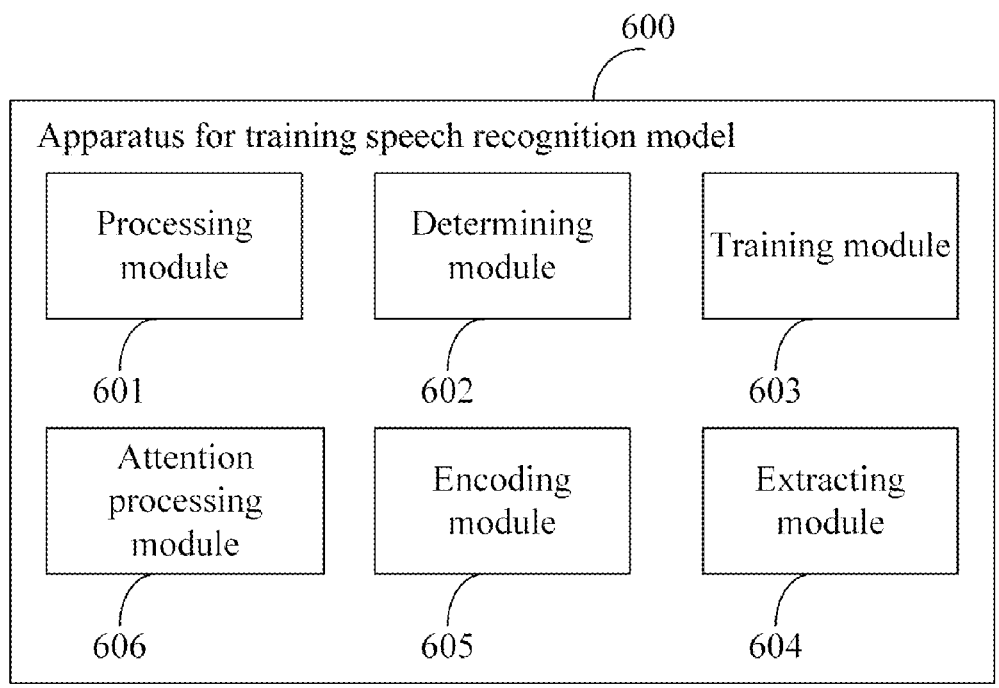
FIG. 6 is a schematic diagram according to a sixth embodiment of the present disclosure.

As shown in FIG. 6, some embodiments further provide an apparatus for training a speech recognition model, and the apparatus 600 includes a processing module 601, a determining module 602 and a training module 603, and further includes an extracting module 604, an encoding module 605 and an attention processing module 606.

The extracting module 604 is configured for extracting acoustic features of a speech; the encoding module 605 is configured for encoding the acoustic features to obtain encoded features; the attention processing module 606 is configured for processing the encoded features to obtain features after the attention processing operation.

In the embodiment of the present disclosure, the acoustic features are extracted and encoded, and the attention processing operation is performed on the encoded features, such that semantic features may be obtained and decoded to obtain the predicted text, thereby training the speech recognition model based on the predicted text. The first probability is calculated using the acoustic decoding model, the second probability is calculated using the language model, the fusion probability is obtained based on the first probability and the second probability, and the candidate text is selected based on the fusion probability, such that the more accurate candidate text may be obtained, thereby improving the recognition effect of the speech recognition model. The fusion probability is obtained by performing weighted summation of the first probability and the second probability, thus simply and conveniently calculating the fusion probability. The local error optimizing effect may be achieved by calculating the accumulated error number.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

According to the embodiment of the present disclosure, there are also provided an electronic device, a readable storage medium and a computer program product.

Figure 7:
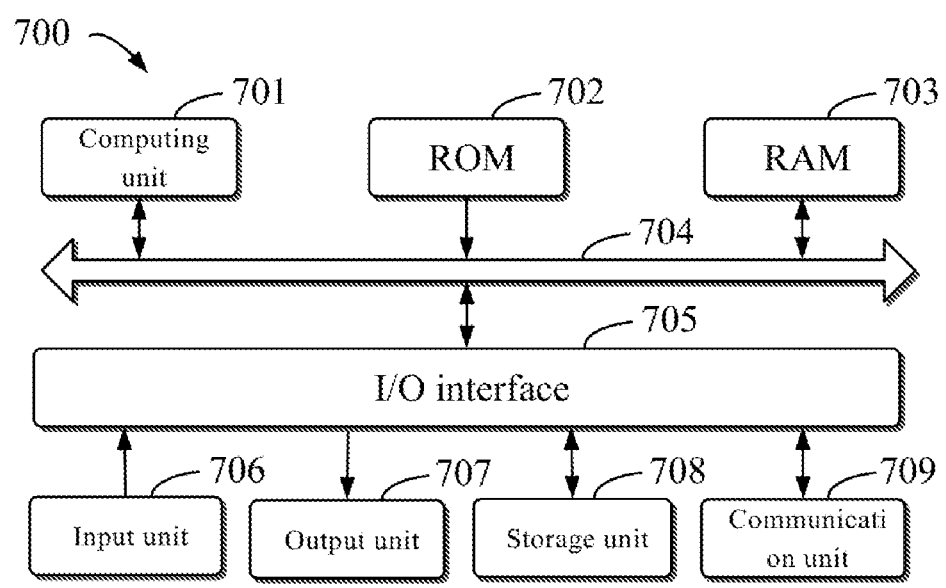
FIG. 7 is a schematic diagram of an electronic device configured to implement any of methods for training a speech recognition model according to the embodiments of the present disclosure.

FIG. 7 shows a schematic block diagram of an exemplary electronic device 700 which may be configured to implement the embodiments of the present disclosure. The electronic device is intended to represent various forms of digital computers, such as laptop computers, desktop computers, workstations, servers, blade servers, mainframe computers, and other appropriate computers. The electronic device may also represent various forms of mobile devices, such as personal digital assistants, cellular telephones, smart phones, wearable devices, and other similar computing devices. The components shown herein, their connections and relationships, and their functions, are meant to be exemplary only, and are not meant to limit implementation of the present disclosure described and/or claimed herein.

As shown in FIG. 7, the electronic device 700 includes a computing unit 701 which may perform various appropriate actions and processing operations according to a computer program stored in a read only memory (ROM) 702 or a computer program loaded from a storage unit 708 into a random access memory (RAM) 703. Various programs and data necessary for the operation of the electronic device 700 may be also stored in the RAM 703. The computing unit 701, the ROM 702, and the RAM 703 are connected with one other through a bus 704. An input/output (I/O) interface 705 is also connected to the bus 704.

The plural components in the electronic device 700 are connected to the I/O interface 705, and include: an input unit 706, such as a keyboard, a mouse, or the like; an output unit 707, such as various types of displays, speakers, or the like; the storage unit 708, such as a magnetic disk, an optical disk, or the like; and a communication unit 709, such as a network card, a modem, a wireless communication transceiver, or the like. The communication unit 709 allows the electronic device 700 to exchange information/data with other devices through a computer network, such as the Internet, and/or various telecommunication networks.

The computing unit 701 may be a variety of general and/or special purpose processing components with processing and computing capabilities. Some examples of the computing unit 701 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 701 performs the methods and processing operations described above, such as the method for training a speech recognition model. For example, in some embodiments, a human-machine conversation method may be implemented as a computer software program tangibly contained in a machine readable medium, such as the storage unit 708. In some embodiments, part or all of the computer program may be loaded and/or installed into the electronic device 700 via the ROM 702 and/or the communication unit 709. When the computer program is loaded into the RAM 703 and executed by the computing unit 701, one or more steps of the method for training a speech recognition model described above may be performed. Alternatively, in other embodiments, the computing unit 701 may be configured to perform the human-machine conversation method by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input device, and at least one output device.

Program codes for implementing the method according to the present disclosure may be written in any combination of one or more programming languages. These program codes may be provided to a processor or a controller of a general purpose computer, a special purpose computer, or other programmable data processing devices, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display device (for example, a cathode ray tube (CRT) or liquid crystal display (LCD) monitor) for displaying information to a user; and a keyboard and a pointing device (for example, a mouse or a trackball) by which a user may provide input for the computer. Other kinds of devices may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for training a speech recognition model, the speech recognition model comprising an acoustic decoding model and a language model, the method comprising:
   obtaining a fusion probability of each of at least one candidate text corresponding to a speech based on the acoustic decoding model and the language model;
   selecting a preset number of one or more candidate texts based on the fusion probability of each of the at least one candidate text, and determining a predicted text based on the preset number of one or more candidate texts; and
   obtaining a loss function based on the predicted text and a standard text corresponding to the speech, and training the speech recognition model based on the loss function,
   wherein the obtaining the loss function based on the predicted text and the standard text corresponding to the speech comprises:
      obtaining an accumulated number of errors of the predicted text based on the predicted text and the standard text corresponding to the speech, the accumulated error number being obtained based on a historical error number and a current error number; and
      obtaining the loss function based on the accumulated error number of the predicted text.

2. The method according to claim 1, wherein the obtaining the fusion probability of each of the at least one candidate text corresponding to the speech based on the acoustic decoding model and the language model comprises:
   processing an output text at a previous moment and acoustic related information at a current moment using the acoustic decoding model to obtain a first probability corresponding to the at least one candidate text corresponding to the speech;
   processing the output text at the previous moment using the language model to obtain a second probability corresponding to the candidate text; and
   obtaining the fusion probability of the candidate text based on the first probability and the second probability.

3. The method according to claim 2, wherein the obtaining the fusion probability of the candidate text based on the first probability and the second probability comprises:
   for the candidate text, performing weighted summation of the first probability and the second probability to obtain a weighted summation value, and determining the weighted summation value as the fusion probability of the corresponding candidate text.

4. The method according to claim 1, wherein the determining the predicted text based on the preset number of the one or more candidate texts comprises:
   if the preset number of the one or more candidate texts comprise the standard text, determining the preset number of the one or more candidate texts as the predicted text; if the preset number of the one or more candidate texts do not comprise the standard text, replacing one candidate text of the preset number of the one or more candidate texts with the standard text to obtain one or more texts after the replacing, and determining the one or more texts after the replacing as the predicted text.

5. The method according to claim 1, wherein the speech recognition model further comprises an encoder and an attention model, the acoustic related information is features after an attention processing operation, and the method further comprises:
   extracting acoustic features of the speech;
   encoding the acoustic features using the encoder to obtain encoded features; and
   performing the attention processing operation on the encoded features using the attention model to obtain the features after the attention processing operation.

6. An electronic device, comprising:
   at least one processor; and
   a memory connected with the at least one processor communicatively;
   wherein the memory stores instructions executable by the at least one processor to enable the at least one processor to carry out a method for training a speech recognition model, which comprises:
      obtaining a fusion probability of each of at least one candidate text corresponding to a speech based on an acoustic decoding model and a language model;

selecting a preset number of one or more candidate texts based on the fusion probability of each of the at least one candidate text, and determining a predicted text based on the preset number of one or more candidate texts; and obtaining a loss function based on the predicted text and a standard text corresponding to the speech, and training the speech recognition model based on the loss function, wherein the obtaining the loss function based on the predicted text and the standard text corresponding to the speech comprises:

obtaining an accumulated number of errors of the predicted text based on the predicted text and the standard text corresponding to the speech, the accumulated error number being obtained based on a historical error number and a current error number; and obtaining the loss function based on the accumulated error number of the predicted text.

7. The electronic device according to claim 6, wherein the obtaining the fusion probability of each of the at least one candidate text corresponding to the speech based on the acoustic decoding model and the language model comprises:

processing an output text at a previous moment and acoustic related information at a current moment using the acoustic decoding model to obtain a first probability corresponding to the at least one candidate text corresponding to the speech;

processing the output text at the previous moment using the language model to obtain a second probability corresponding to the candidate text; and obtaining the fusion probability of the candidate text based on the first probability and the second probability.

8. The electronic device according to claim 7, wherein the obtaining the fusion probability of the candidate text based on the first probability and the second probability comprises:

for the candidate text, performing weighted summation of the first probability and the second probability to obtain a weighted summation value, and determining the weighted summation value as the fusion probability of the corresponding candidate text.

9. The electronic device according to claim 6, wherein the determining the predicted text based on the preset number of the one or more candidate texts comprises:

if the preset number of the one or more candidate texts comprise the standard text, determining the preset number of the one or more candidate texts as the predicted text; if the preset number of the one or more candidate texts do not comprise the standard text, replacing one candidate text of the preset number of the one or more candidate texts with the standard text to obtain one or more texts after the replacing, and determining the one or more texts after the replacing as the predicted text.

10. The electronic device according to claim 6, wherein the speech recognition model further comprises an encoder and an attention model, the acoustic related information is features after an attention processing operation, and the method further comprises:

extracting acoustic features of the speech;

encoding the acoustic features using the encoder to obtain encoded features; and performing the attention processing operation on the encoded features using the attention model to obtain the features after the attention processing operation.

11. A non-transitory computer readable storage medium comprising computer instructions, which, when executed by a computer, cause the computer to carry out a method for training a speech recognition model, which comprises:

obtaining a fusion probability of each of at least one candidate text corresponding to a speech based on an acoustic decoding model and a language model;

selecting a preset number of one or more candidate texts based on the fusion probability of each of the at least one candidate text, and determining a predicted text based on the preset number of one or more candidate texts; and obtaining a loss function based on the predicted text and a standard text corresponding to the speech, and training the speech recognition model based on the loss function, wherein the obtaining the loss function based on the predicted text and the standard text corresponding to the speech comprises:

obtaining an accumulated number of errors of the predicted text based on the predicted text and the standard text corresponding to the speech, the accumulated error number being obtained based on a historical error number and a current error number; and obtaining the loss function based on the accumulated error number of the predicted text.

12. The non-transitory computer readable storage medium according to claim 11, wherein the obtaining the fusion probability of each of the at least one candidate text corresponding to the speech based on the acoustic decoding model and the language model comprises:

processing an output text at a previous moment and acoustic related information at a current moment using the acoustic decoding model to obtain a first probability corresponding to the at least one candidate text corresponding to the speech;

processing the output text at the previous moment using the language model to obtain a second probability corresponding to the candidate text; and obtaining the fusion probability of the candidate text based on the first probability and the second probability.

13. The non-transitory computer readable storage medium according to claim 12, wherein the obtaining the fusion probability of the candidate text based on the first probability and the second probability comprises:

for the candidate text, performing weighted summation of the first probability and the second probability to obtain a weighted summation value, and determining the weighted summation value as the fusion probability of the corresponding candidate text.

14. The non-transitory computer readable storage medium according to claim 11, wherein the determining the predicted text based on the preset number of the one or more candidate texts comprises:

if the preset number of the one or more candidate texts comprise the standard text, determining the preset number of the one or more candidate texts as the predicted text; if the preset number of the one or more candidate texts do not comprise the standard text, replacing one candidate text of the preset number of the one or more candidate texts with the standard text to obtain one or more texts after the replacing, and determining the one or more texts after the replacing as the predicted text.

15. The non-transitory computer readable storage medium according to claim 11, wherein the speech recognition model further comprises an encoder and an attention model, the acoustic related information is features after an attention processing operation, and the method further comprises:
- extracting acoustic features of the speech;
- encoding the acoustic features using the encoder to obtain encoded features; and
- performing the attention processing operation on the encoded features using the attention model to obtain the features after the attention processing operation.

* * * * *